United States Patent [19]

Passoni

[11] Patent Number: 4,518,088

[45] Date of Patent: May 21, 1985

[54] MODULAR ASSEMBLY-TYPE STAND STRUCTURE PARTICULARLY FOR SUPPORTING STORAGE BATTERIES

[75] Inventor: Mario Passoni, Brugherio, Italy

[73] Assignee: Passoni Paolo & Figli S.r.l., Brugherio, Italy

[21] Appl. No.: 419,638

[22] Filed: Sep. 17, 1982

[30] Foreign Application Priority Data

Feb. 5, 1982 [IT] Italy .............................. 19484 A/82

[51] Int. Cl.$^{3}$ ................................................ A47F 7/00

[52] U.S. Cl. ....................................... 211/13; 211/175

[58] Field of Search ............... 211/13, 175, 189, 49 D; 248/172; 403/387, 388; 108/55.3

[56] References Cited

U.S. PATENT DOCUMENTS

| | | | |
|---|---|---|---|
| 580,655 | 4/1897 | Thew | 211/175 X |
| 865,268 | 9/1907 | Powell | 211/175 X |
| 1,775,572 | 9/1930 | Ross | 403/387 X |
| 2,623,641 | 12/1952 | Shield | 211/59.2 |
| 2,767,951 | 10/1956 | Cousino | 403/387 X |
| 4,025,137 | 5/1977 | Wyler | 248/172 X |
| 4,046,261 | 9/1977 | Yake | 211/41 |

FOREIGN PATENT DOCUMENTS

| | | | |
|---|---|---|---|
| 774829 | 5/1957 | United Kingdom | 211/13 |

*Primary Examiner*—Ramon S. Britts
*Assistant Examiner*—Sarah A. Lechok
*Attorney, Agent, or Firm*—Guido Modiano; Albert Josif

[57] ABSTRACT

The stand structure for supporting storage batteries comprises stepped supporting side boards including a box-like body with openings formed therethrough which are defined at top edges laying substantially perpendicular to the plane of lay of the side boards. Also provided are longitudinal stringers for engagement at the top edges and having a body of polygonal cross-sectional configuration and formed with a longitudinal slot at the bottom face which engages with the top edges and a vertical flange extending vertically upwards.

5 Claims, 8 Drawing Figures

10
11
3
2
10
16
3
2
15
3
2
16
15

3
2
1

16
10
11

20
15
3
2
21
1

10
10

11
30
15
32
31
32
15

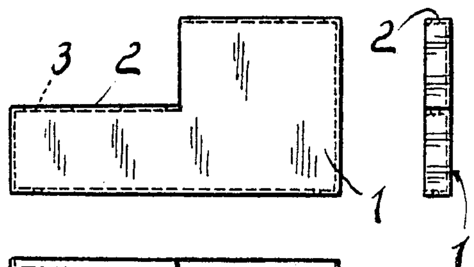
Fig. 4
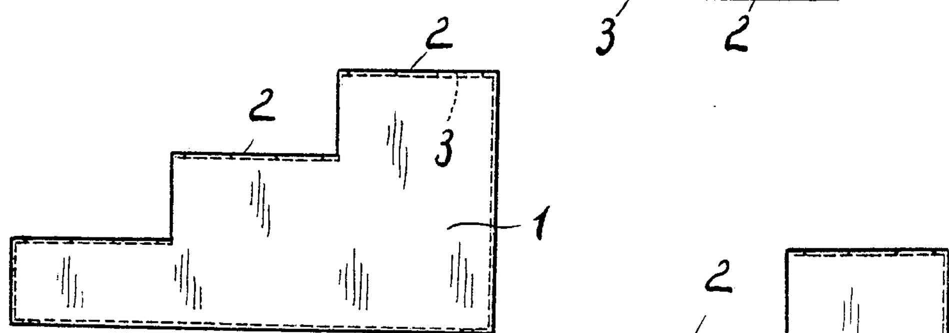
Fig. 5
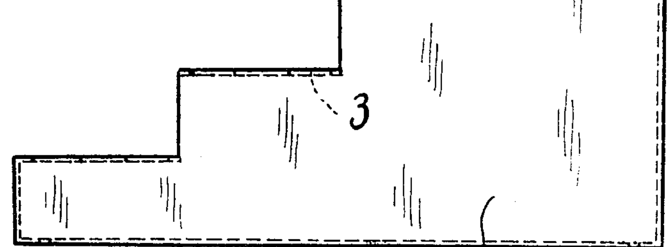
Fig. 6
Fig. 7
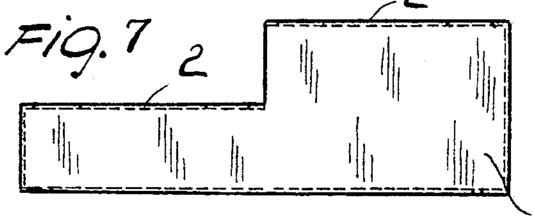
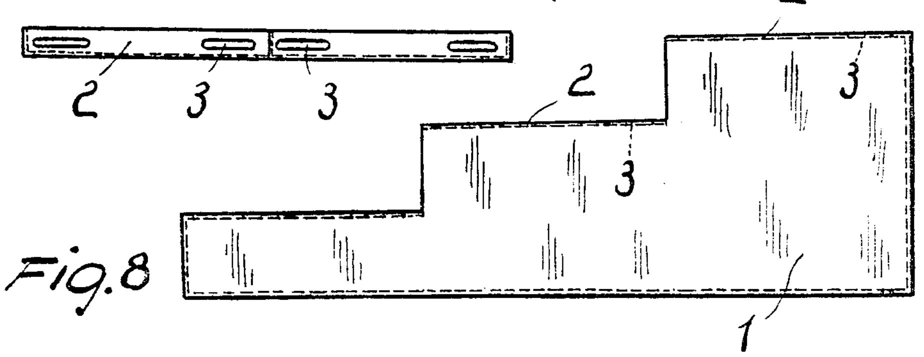
Fig. 8

MODULAR ASSEMBLY-TYPE STAND STRUCTURE PARTICULARLY FOR SUPPORTING STORAGE BATTERIES

BACKGROUND OF THE INVENTION

This invention relates to a modular assembly-type stand structure particularly for storage batteries.

It is a known fact that several industrial sites where large size storage batteries are utilized require the availability of a stand to store such batteries, the stand having in general a stepped or stair-like configuration, whereby the batteries can be accommodated in multiple arrays at different levels to facilitate the battery checking and servicing procedures.

Such stands, in accordance with a conventional design, currently comprise stepped profile side boards which define, at the top, a plurality of shelves for L-like longitudinal stringers whereon the batteries are laid.

The connection between the stringers and side boards is implemented by welding them together, thus forming a single piece assembly which must be erected on the site of use and cannot be converted where the user's requirements happen to change.

According to other prior proposals, modular assembly-type stands are provided which can overcome the above limitation and comprise two side boards, or side plates, having a pair of uprights which are interconnected by means of cross-members having a C-like cross-section and being arranged to face each other to function as supporting members for the ends of stringers which are bolted to said cross-members and serve as supporting decks for the storage batteries.

The latter prior stand structure, while having the advantage that it can be taken apart, has first of all the disadvantage of having poor modularity features in that, even though a number of such stands may be laid side-by-side, some problems are encountered in connecting together the banks of battieries carried on the side-by-side stands because the side boards do interfere significantly.

A further prior proposal provides side plates of sheet metal with a stepped upper profile which are formed, through the body of each said side plates, with slots wherein mounting bolts are arranged to engage for securing the stringers which comprise tubular elements butt connected to the side plates and having expanding elements at their ends for engagement with said bolts. This stand has the shortcoming that the longitudinal stringers are butt connected, and above all that the bolt are subjected to high shear stresses, which are liable to fail under the heavy weight imposed on them.

Moreover, one portion of the side plates, above the slots, protrudes with respect to the stringers, so that, even by laying a number of modules adjacent one another, the side protruding portions would still interfere with a satisfactory side-by-side arrangement of the batteries.

SUMMARY OF THE INVENTION

Accordingly, the task of the invention is that of removing the drawbacks and limitations mentioned hereinabove by providing a modular assembly-type stand structure particularly for supporting storage batteries, which affords a very practical and versatile assembly wherein the battery supporting longitudinal stringers are arranged to fit one another in a continuous succession, even where several modules are laid side-by-side, and which has no shear-loaded bolts.

Within this task it is an object of this invention to provide such a modular assembly-type stand structure which can be very practical and versatile as readily adapted to varying contingent requirements.

A further object of the invention is to provide such a modular assembly-type stand structure, wherein the longitudinal stringers are not butt connected to the side plates or boards, thereby the side plates or boards can be positioned to meet contingent requirements and in conformity with the loads to be carried.

Yet another object of this invention is to provide a modular assembly-type stand structure as indicated, which has peculiar constructional features ensuring the highest degree of reliability and functionality in use.

According to one aspect of the invention the above task and objects as well as yet other objects, such as will be apparent hereinafter, are achieved by a modular assembly-type stand structure particularly for supporting storage batteries, characterized in that it comprises supporting side plates having a box-like body with through openings defined at the top edges extending substantially perpendicular to the plane of lay of said side plates, also provided being longitudinal stringers arranged for engagement at said top edges and formed, in cross-section, with a polygonal body having a longitudinal slot at the lower face thereof adapted to engage with said top edges and with a vertical flange extending upwards therethrough.

BRIEF DESCRIPTION OF THE DRAWINGS

Further features and advantages will become more apparent from the following description of a preferred, but not limitative, embodiment of this modular assembly-type stand structure particularly for supporting storage batteries, with reference to the accompanying merely illustrative drawings, where:

FIG. 4 shows, in front, side and top views one posssible embodiment of a side plate according to the invention;

FIGS. 5 and 6 show schematically side plates with three and four steps; and FIGS. 7 and 8 show schematically side plates formed with deep steps.

DESCRIPTION OF THE PREFERRED EMBODIMENTS

Figure 1:
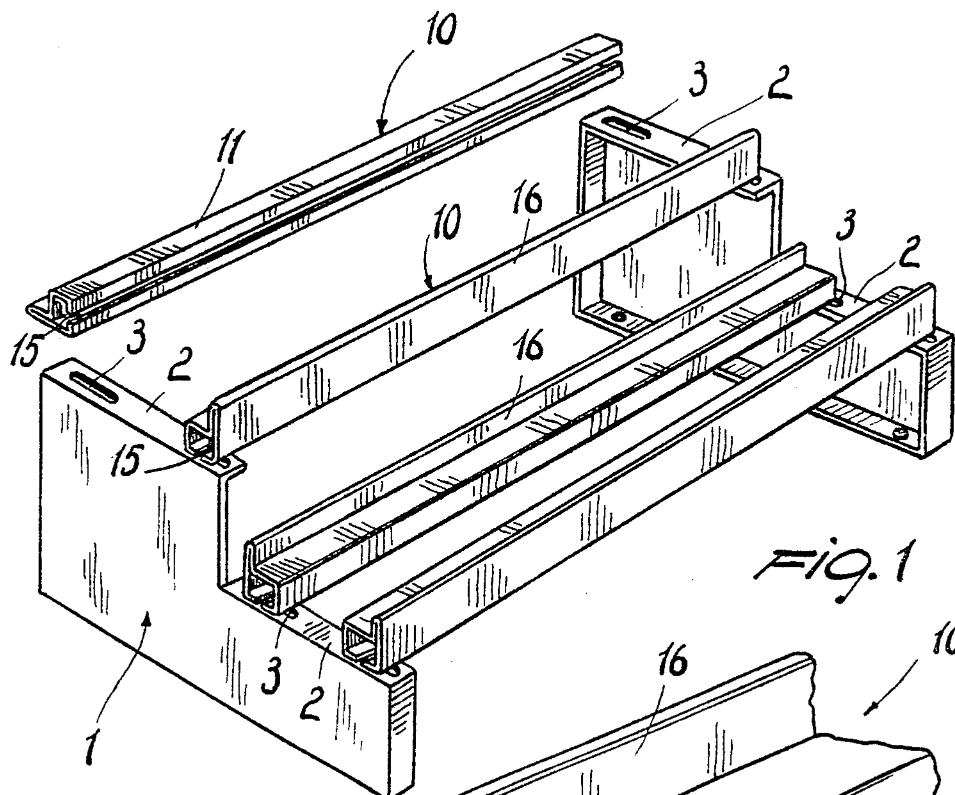
FIG. 1 is a schematical perspective view of one possible embodiment of this modular assembly-type stand.

Making reference to the drawing figures, this modular assembly-type stand structure particularly for supporting storage batteries, and the like, comprises supporting side plates, generally indicated at 1, which are advantageously formed from sheet metal to produce an open box structure such that peripheral edges are defined thereon, which extend in a substantially perpendicular plane to the plane of lay of the side plates.

At the top edges 2, which follow a stepped pattern, there are provided throughgoing openings 3 of elongated configuration along the widthwise extension of said edges, as visible in FIG. 1.

On said top edges 2 interconnectable longitudinal stringers 10 can be laid, more specifically one pair of longitudinal stringers at each shelf plane defined by the top edges, which stringers 10 have a body 11 of substantially rectangular configuration which defines a longitudinal slot 15 at its lower or bottom side to be laid in contact with the top edges 2.

When viewed in cross-section, the stringer 10 defines a vertical flange 16 which extends upwardly from the body 11.

Advantageously, the stringers are formed by suitably bending a sheet metal blank such that the vertical flange is integral with the body 11 and has a thickness dimension which is substantially twice that of the body forming a double-walled flange portion.

Figure 2:
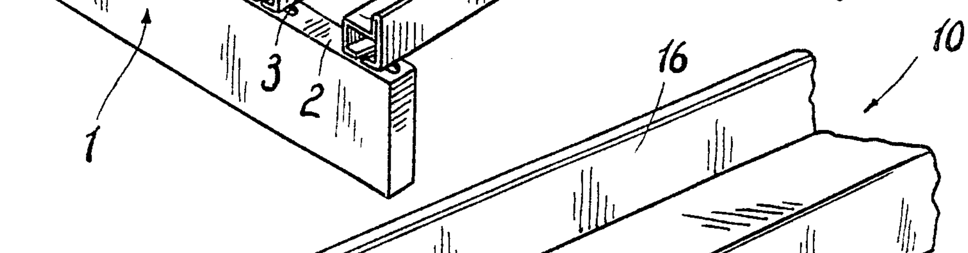
FIG. 2 is an exploded view of the connection between the stringers and side plates.
Figure 3:
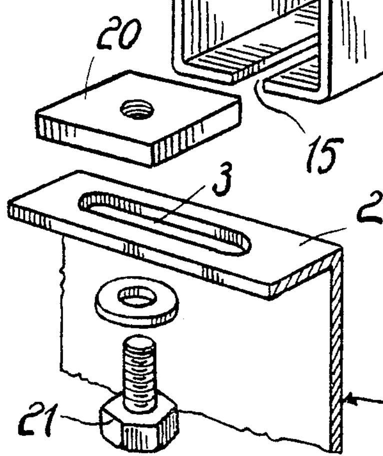
FIG. 3 is a sectional view through the connection between stringers and a central side plate.
Figure 3:
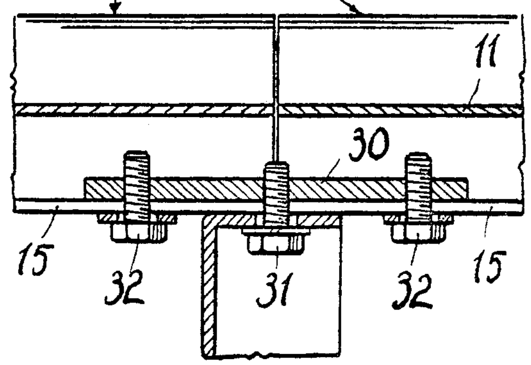

To achieve a steady connection of the stringers 10 to the side plates 1, mounting plates 20 are provided which can be inserted through the body 11 and function as engagement elements for bolts 21 passed through below the openings 3 to thereby clamp the side plates and stringers together. Plates 20 and bolts 21 form, in conjunction with openings 3 in the top edges, removable mounting means, as infered from what has been said and as in FIG. 2 visible.

The peculiar construction provided, which includes a longitudinal stringer formed with a longitudinal slot, enables the side plates to be positioned at any points along the stringers.

Where a number of side-by-side modular stands are arranged, the abutting stringers would overlap at the side plates and a multiple mounting plate will be provided, as indicated at 30, having three threaded holes for engagement, respectively, with a central bolt 31 provided at the side plates, and side bolts 32 provided at each stringer.

It should be further noted that the provision of openings 3 of elongated configuration allows the mutual distance between a pair of stringers on each shelf to be adjusted within broad limits to fit the sizes of the storage batteries.

Moreover, the vertical flange 16 acts in practice as a containment element for the batteries, so that the latter can be positively held in position.

It will be appreciated from the foregoing that the invention achieves its objects, and in particular that a modular structure is provided which can be easily and rapidly disassembled and reassembled, since its various members are only bolt connected to one another, and that it may be constructed to the dimensions and configurations which best suit the user's own requirements.

Furthermore, stands of any desired length may be set up, still having their stringers aligned continuously together as an extension of one another, without intervening partitions which may consititute a hindrance at the areas of connection to the side plates.

Also, the number of side plates which may be mounted at each stand may be varied in accordance with contingent requirements, since plural side plates may be arranged where very heavy weights are to be supported.

Moreover, with the arrangement described hereinabove, it is provided for the stringers to rest on top of the upper or top edges of the side plates, and the mounting bolts are not subjected to shear stresses as with the aforementioned conventional arrangements.

Advantageously, the cited stringers would be coated, inside and out, with a PVC material, which is sulphonic acid-resistant; the side plates would be preferably painted with powder paints.

The invention as described is susceptible to many modifications and variations without departing from the scope of the instant inventive concept.

Moreover, all of the details may be replaced with other technically equivalent elements.

In practicing the invention, the materials employed, as well as the dimensions and contingent shapes, may be any selected ones to suit individual application requirements.

I claim:

1. A modular assembly-type stand structure particularly for supporting storage batteries, comprising:
- step-like shaped supporting side plates, defining at least two shelf planes;
- top edges of said side plates, whose surfaces extend substantially perpendicular to said side plates;
- longitudinal stringers extending in lengthwise direction arranged for mutual engagement at said top edges;
- through openings, having an elongated configuration in said top edges for widthwise adjustment of the mutual distance between a pair of said longitudinal stringers;
- a slot at the lower face of said longitudinal stringers adapted to engage with said top edges for lengthwise adjustment of the mutual distance between a pair of said supporting side plates; and
- removable mounting means connecting said longitudinal stringers to said side plates.

2. A modular assembly-type stand structure, as claimed in claim 1, wherein said side plates are formed of substantially vertical wall portions extending in widthwise directions, on which edges extending in lengthwise directions are provided to form an open-box-shaped structure, part of which are said top edges with said elongated through openings.

3. A modular assembly-type stand structure, as claimed in claim 1, wherein said longitudinal stringers are formed of a sheet bent to provide rectangular body configuration with a double-walled flange portion, extending upwardly from said body.

4. A modular assembly-type stand structure, as claimed in claim 1, wherein said longitudinal stringers are coated with polyvinylchloride, both inside and outside.

5. A modular assembly-type stand structure, particularly for supporting storage batteries, comprising:
- step-like shaped supporting side plates, extending widthwise, having an open-box-like structure;
- top edges of said open-box-like structure, whose surface extends substantially perpendicular to said side plates, in lengthwise direction;
- longitudinal stringers, extending in lengthwise direction, arranged for mutual engagement at said top edges;
- through openings having an elongated configuration on said top edges for widthwise adjustment of the mutual distance between a pair of said longitudinal stringers;
- a longitudinal slot at the lower face of said longitudinal stringers adapted to engage with said top edges for lengthwise adjustment of the mutual distance between a pair of said supporting side plates;
- removable mounting means connecting said longitudinal stringers to said side plates;
- said longitudinal stringers being formed of a sheet bent to provide rectangular body configuration with a double-walled flange portion, extending upwardly from said body.

* * * * *